(12) United States Patent
Colborne

(10) Patent No.: US 7,695,049 B2
(45) Date of Patent: Apr. 13, 2010

(54) INNER SUPPORTED CLIMATE CONTROLLED SINGLE TRAILER SHELTER

(76) Inventor: Bruce J. Colborne, 19 Foster's Ct., Sugar Land, TX (US) 77479

( * ) Notice: Subject to any disclaimer, the term of this patent is extended or adjusted under 35 U.S.C. 154(b) by 1388 days.

(21) Appl. No.: 11/113,211

(22) Filed: Apr. 25, 2005

(65) Prior Publication Data

US 2006/0055193 A1    Mar. 16, 2006

Related U.S. Application Data

(60) Provisional application No. 60/568,179, filed on May 4, 2004.

(51) Int. Cl.
*B60P 3/32* (2006.01)
*E04H 15/14* (2006.01)

(52) U.S. Cl. ............ 296/161; 296/159; 52/2.11; 52/2.18; 135/88.13

(58) Field of Classification Search ............ 296/159, 296/161, 164, 165, 168, 173; 52/2.11, 2.22, 52/2.23, 2.24, 2.18; 135/88.13, 88.15
See application file for complete search history.

(56) References Cited

U.S. PATENT DOCUMENTS

| | | | | | |
|---|---|---|---|---|---|
| 3,393,479 | A | * | 7/1968 | Slotnick | 52/2.17 |
| 3,871,399 | A | * | 3/1975 | Watson | 137/899 |
| 4,296,960 | A | * | 10/1981 | Winchester | 296/167 |
| 5,331,991 | A | * | 7/1994 | Nilsson | 135/93 |
| 5,692,795 | A | * | 12/1997 | Mininger | 296/164 |
| 5,706,846 | A | * | 1/1998 | Sutton | 135/128 |
| 6,179,367 | B1 | * | 1/2001 | Bowen | 296/161 |

* cited by examiner

Primary Examiner—Joseph D Pape
(74) Attorney, Agent, or Firm—Juan J. Lizarraga

(57) ABSTRACT

A portable climate controlled air shelter system on a transport device such as a trailer, truck bed or ISO container box with all sub-systems integral to the transport device where the sub systems include an inflatable air shelter with inflation/deflation blower, electrical power generator and fuel system pre-wired to all other sub systems, heating ventilation and air conditioning unit, air filtration, inflation/deflation blower, water management system, external lighting, central control panel for single point monitoring and control of the air shelter system and physical storage. Also provided are compressed air tanks for inflation of the air shelter as well as water ballast tubes that mechanically attach to the air shelter to provide stability in winds and on uneven ground. The water management system includes a water storage tank and pump for filling and emptying the water ballast tubes. The air shelter system also has transfer switch to allow the system to run on external "house power".

10 Claims, 15 Drawing Sheets

INNER SUPPORTED CLIMATE CONTROLLED SINGLE TRAILER SHELTER

This application claims the benefit of provisional patent application 60/568,179, filed on May 4, 2004 by the present inventor (Bruce Colborne).

FIELD OF INVENTION

This invention relates to portable climate controlled shelters, specifically to self-contained systems providing power generation, heating and cooling, filtration and inner supported climate controlled shelter.

BACKGROUND OF THE INVENTION

As civilization stretches its geographic boundaries to remote or undeveloped locations, people increasingly need protection from harsh climatic environments, e.g. heat, cold, rain, snow, and a variety of air pollutants. This has become especially important for society's first responders, e.g. public safety, fire fighters, disaster recovery, terror response, and military field operations. There is also growing concern for such solutions from other parts of the private and public sectors, e.g. rehabilitation of fire fighters, emergency workers, general relief efforts, sports training, special events, schools and universities and commercial outdoor endeavors.

The invention described in this non-provisional patent application is a portable climate controlled shelter that can be taken to remote or undeveloped locations using a trailer and/or pickup truck bed, set-up and dismantled in minutes, and operated without an external electrical power source. Our search for prior art of existing patents did not reveal a similar solution to this invention. There are other solutions available such as recreational vehicles and pop-up trailer tents, but these alternatives have different versatility and do not accommodate large groups of people. To date, people have transported the individual and independent non-integrated sub-systems, e.g. portable generators, heating units, cooling units, electrical wiring cables, structural frames for use with portable shelters, used in this invention to a location and set them up as a system on-site. Previous history shows the onsite integration of these independent components require both technical and non-technical crews, e.g. licensed HVAC technicians, licensed technicians, licensed diesel generator engineers, and labor crews able to move items in excess of 500 pounds. Integrating these sub-systems on a portable embodiment significantly reduces setup time (from 8 hours to 15 minutes), eliminates the need for technically skilled setup personnel, and does not require movement of heavy sub-systems.

SUMMARY OF THE INVENTION

This invention's unique integration of systems allows lay people to quickly set-up and obtain protection from harsh climatic environments. In one embodiment, the invention-known collectively as the Rapid Air Shelter™ (RAS) or identified herein as the air shelter system:

(a) Integrates all of the sub-systems on a trailer;
(b) pre-connects an inflation/deflation system, HVAC supply/return ducting system, internal shelter lighting system, unit controls, and water ballast systems to a portable air shelter, electrical generator (with fuel system) pre-wired to the other sub-systems, e.g. HVAC, auxiliary electrical power for the air shelter (referred to herein as either air shelter or portable air shelter), a panel for a single point of monitoring and controlling the system, and surrounding area external lighting system; and provides
(c) Management of the water systems by integrating a water reservoir (storage tank) on the portable embodiment to fill or empty the portable air shelter's water ballast system, collect HVAC condensate to avoid water spillage in the affected area, and provide high pressure water for clean-up and wash down activities.

Accordingly, besides the objects and advantages of the invention described above, several objects and advantages of the present invention include:

(a) An air shelter system that will accommodate a variety of different size electrical generators, HVAC systems, and portable air shelters depending on the requirements of the users and their outdoor event;
(b) A single point of monitoring and control for all electrical and mechanical functions;
(c) Various fuel options include a diesel, gasoline or LP powered generator. The gasoline generator has a lower initial cost while a diesel generator has better fuel consumption and a longer generator life. All generator options include the necessary modifications to the fuel system, exhaust system and structure or frame requirements. The LP generator has a lower level of emissions but added difficulty in finding the available LP fuel sources.
(d) A generator transfer switch allows the user to run the entire unit on an external 230 Volt A/C "house power" instead of the on board generator. This serves to improve the flexibility of operation in a variety of conditions. The electrical transfer switch and wiring harness enables:
  1. Electrical power supply from the generator to the on board equipment with the inherent advantage of needing no external power. Being a pre-wired system eliminates the need for complex field wiring and commissioning by licensed personnel.
  2. Electrical power supply from an external power source to power the on board equipment with the inherent advantage of operating from "house or field" power (if available) and not using stored fuel. This will allow a lower operating cost and reduced on site emissions from the generator engine.
  3. Electrical power from the on board generator to power an external load with the inherent advantage to back-feed power from the generator to a separate load. This means the unit is capable of providing power to run other emergency equipment, failed generators, back-up other generators, or a host of independent electrical loads in the event of a power outage.
(e) 115-volt convenience outlet with power return extension cord is perfect for running small appliances in the portable air shelter. A ground fault interrupt breaker for safe use in wet conditions protects the users. Because the power cord has an automatic return, the cord can be easily rewound and stored in the tent cabinet.
(f) Dual 500 to 5000 watt outside (weather proof) lights mounted on poles allows full exterior lighting for nighttime operation. This option provides 360-degree lighting around the portable air shelter and trailer. This option has a built in locking assembly for stable operation in high winds. The power supply is pre-wired and controllable from the unit's control panel. The light pole is integrally mounted on the trailer frame for storage when not in use.
(g) Options for either electric or propane heating are accommodated. The propane option provides an aluminized heat exchanger and propane burner rack for efficient heating. This also includes a propane fuel tanks, fuel system and pressure regulating valve. Propane heating provides a lower operating cost as compared to electric resistance heating (h) The HVAC supply/return duct connections to the portable air shelter use 12" round duct collars that facilitate quick installation and tear down. Flexible ducting extensions allow the air shelter to be up to 100' away from the trailer. The flexible ducting extensions can be easily interconnected to extend this distance. The extensions come in 25'. The on board trailer storage can accommodate up to 50' of flexible ducting. An optional design to eliminate the external round duct and directly connect the air shelter to the HVAC unit exists. This rectangular duct sleeve with industrial Dual Lock Velcro improves the efficiency of air transfer that allows better cooling and heating from the HVAC unit.

(i) Heavy-duty condensate drain hose connects the HVAC to the water reservoir. 25 to 100' of heavy-duty condensate drain hose connects the water reservoir to a water pump to the air shelter water ballast system and electrically controlled by the control panel. The trailer has adequate storage for these hoses.

(j) An integral chemical air filter rack capable of holding "charcoal filter canisters". The charcoal filters have the capability to remove smoke and hydrocarbons from the return air stream prior to cooling. This built in smoke and allergen removal system is perfect for environments where the outside air is not acceptable for safe breathing. The integration of high capacity filtration into a portable air condition unit in conjunction with a portable air shelter is unique to the HVAC and portable tent industries.

(k) A dynamic air filter combines electrostatic polarization and activated carbon to provide the most complete air filtering system available. This filter captures up to 97% at 3 microns size particles. Two types of filters are available with this system, (2") 30% efficient pleated media filters, and (4") 65% efficient pleated media filters.

(l) A sterile sweep UV lighting system couples a high output UVC lamp with an oscillating parabolic reflector to produce an intense, focused beam of scanning UVC. This sterilizing beam penetrates deep into the media, killing collected pathogens. This allows inactivation of even highly resistant molds and bacteria such as Anthrax. This device is most effectively used in conjunction with the dynamic air filter (electrostatic/polarization and activated carbon filter rack) previously described.

(m) A dirty filter gauge is included. It is a high quality differential pressure gauge installed to monitor the pressure drop across the filters. This allows the operator to monitor and change the media to maintain peak performance and the highest quality of filtered air to the air shelter.

(n) Besides having an integral air blower to inflate and deflate the air shelter within minutes, a high-pressure tank of compressed air (4000-PSI) is included for emergency inflation of the air shelter. One air tank will completely inflate the air shelter within minutes. This additional backup supply of compressed air provides a static charge of high-pressure air to the structural airframe for situations when the generator is off line. This allows the generator to be repaired or maintained and the structure of the air shelter is not compromised. The air shelter is designed and built to support itself without additional air after it has been correctly inflated, but having a back up compressed air supply provides safety in case of some type of emergencies. The air tanks are easily recharged at most marine outfitter and welding supply stores.

(o) The air shelter is designed with water ballast tubes that mechanically fasten (zip) on to the base of the air shelter. These water ballast tubes can be filled with water for ballast (stability for windy or uneven ground). This ballast system provides an even distribution of weight across the shelter base without any non-integral heavy weights, tie down cords, or ground stakes. The water can be quickly drained and discarded. The air shelter's zip-on water ballast panels can be easily connected to the water hoses connected to the pump and water reservoir.

(p) Shelters are available in a variety of sizes, shapes and configurations. Each shelter is specifically matched to air conditioner and generator capacities. Currently sizes include the following: 10' by 12', 15' by 16', and 16' by 20'. The shelters all have removable ends for connection to other shelters. This means the units are modular and can be configured in hundreds of arrangements to meet the user's needs. The options and configurations available are too varied to list in this document. Modularity and configurability are unique to this industry.

(q) HVAC systems are available in three frame sizes. The smallest fits in a short-bed pick-up truck. The smallest unit is capable of heating and cooling a 10'×12' shelter The next larger size unit is trailer mounted and can support a 16'×20' shelter. The largest size unit is built-in a 20' ISO container. This unit is capable of supporting six shelters that are 16'×20' in size.

In accordance with the present invention, an inner supported climate controlled single trailer shelter comprises an integrated combination of the following major sub-systems on a transport device (trailer, truck bed, and containerized cargo box): electrical power generator and fuel system, HVAC, air filtration, air shelter, inflation/deflation blower, water management, trailer, external lighting, control panel, and physical storage capacity. This invention's high level of integration is unique when compared to the industry practice requiring extensive field assembly. A non-technical person can set up the invention in minutes.

DETAILED DESCRIPTION OF THE INVENTION

The inventive air shelter system has three preferred embodiments including truck bed, trailer, and ISO Container mounted. A trailer embodiment of the inventive air shelter system in ready position is depicted in FIG. 1, but the major systems and individual components would be the same for all embodiments.

Figure 1:
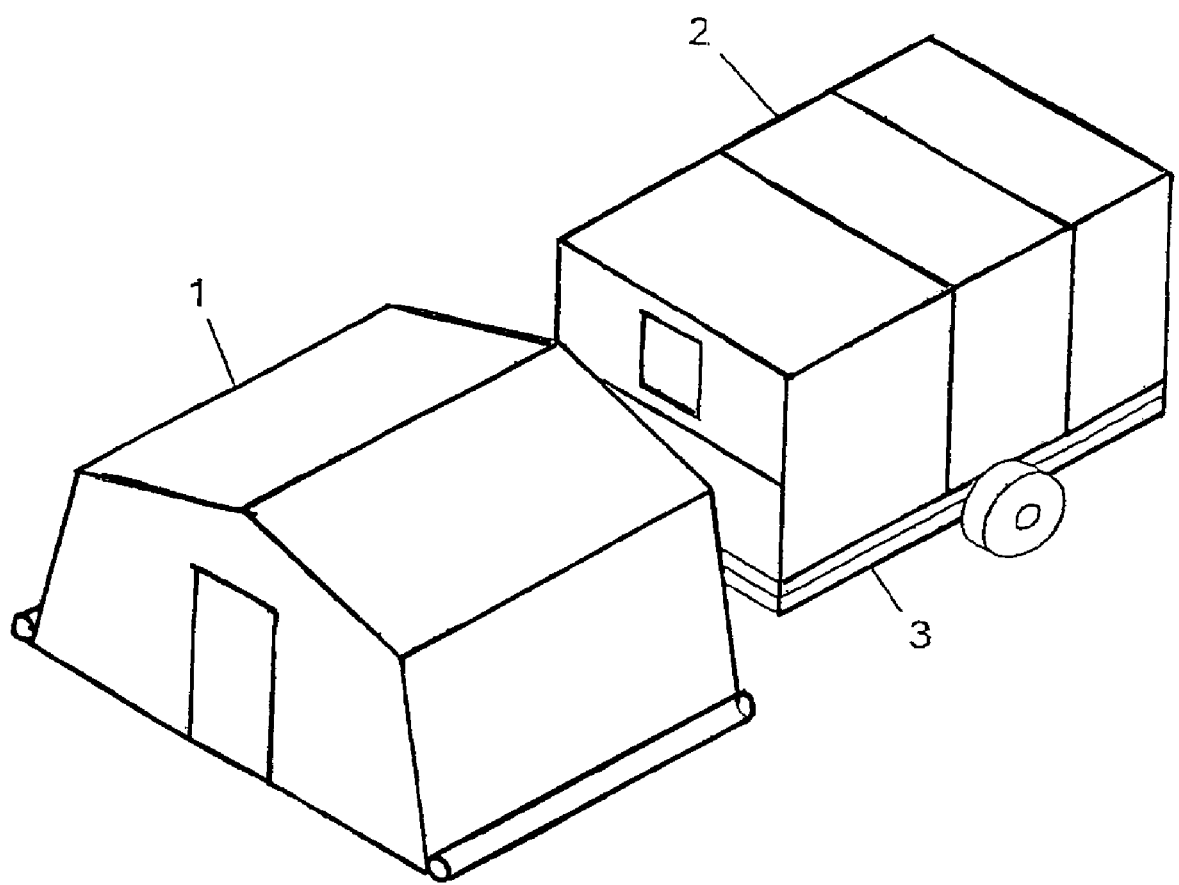
FIG. 1 is a perspective view of the inventive air shelter system in position.

FIG. 1 depicts a perspective view of the trailer embodiment of the inventive air shelter system showing an inflatable portable air shelter 1 and a portable A/C—Generator unit 2 mounted on a trailer 3. Although shown on a trailer 3, the portable A/C—Generator unit 2 could also be mounted on a truck bed or an ISO containerized cargo box.

Figure 2:
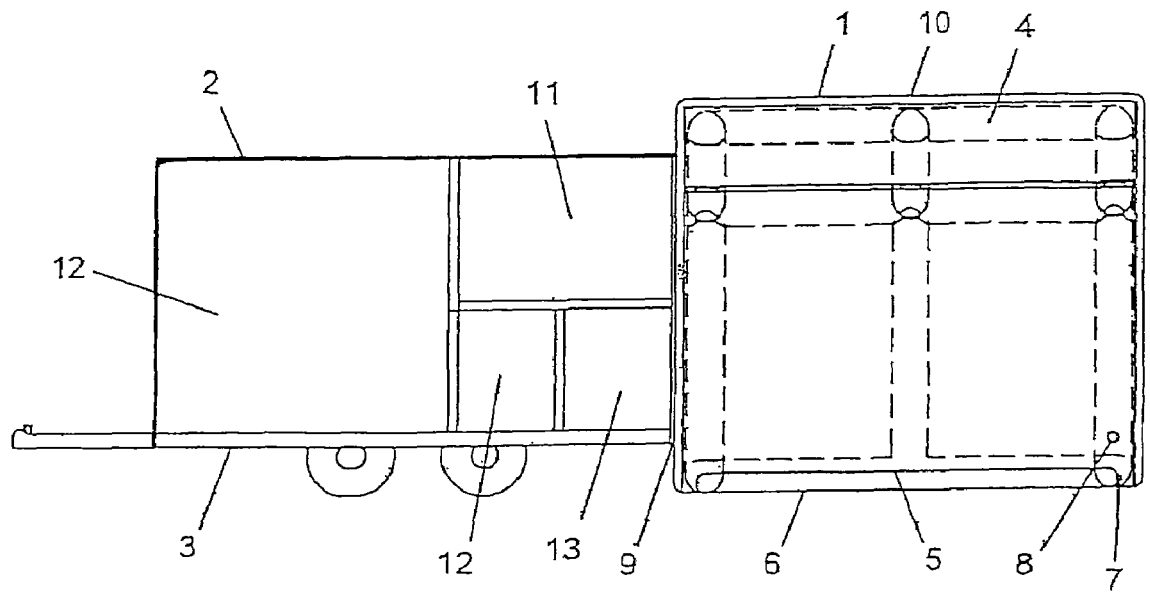
FIG. 2 is a side elevation of the inventive air shelter system.

FIG. 2 depicts a side view of the trailer embodiment of the inventive air shelter system shown in FIG. 1, further showing the high pressure air frame 4 for the inflatable portable air shelter 1, removable water ballast tubes 5 and zip-on connections 6 for attachment of the water ballast tubes 5. Also shown is a water fill port 7 for the water ballast tubes 5, a high pressure air fill port 8 for the airframe 4.

Further depicted in FIG. 2 is an air delivery system 9 between the exterior skin 10 of the portable air shelter 1 and the portable A/C—Generator unit 2, which has a compartment 11 for the A/C heating and cooling unit, a compartment 12 for the generator and storage 13 for the portable air shelter when not being used.

Figure 3:
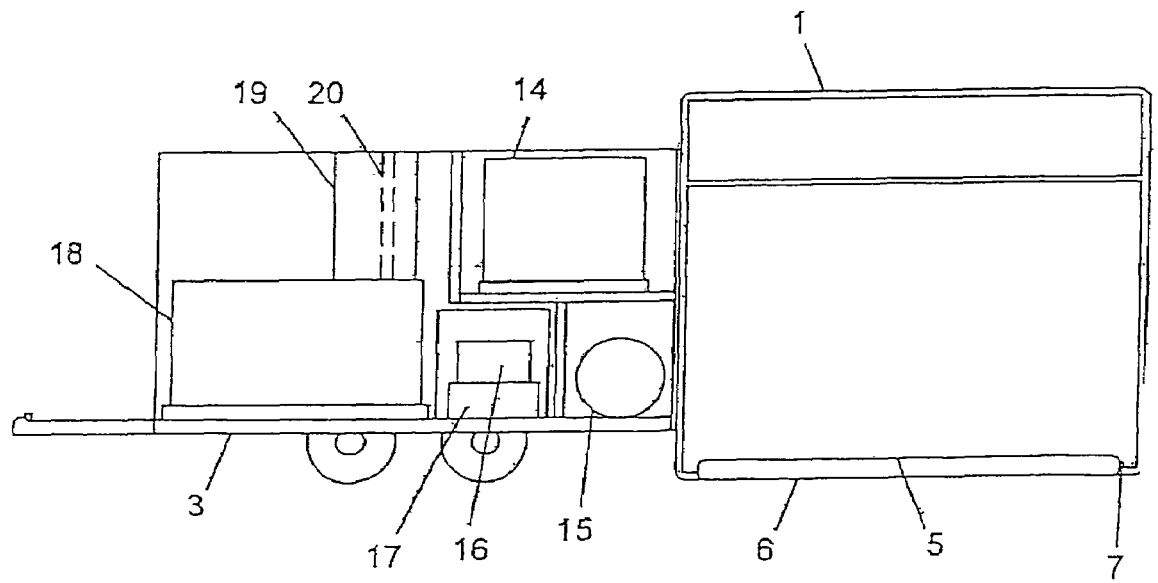
FIG. 3 is an internal side elevation of the components of the inventive air shelter system.

FIG. 3 depicts an internal side elevation showing internal components of the portable A/C—Generator unit 2, including an HVAC unit 14 mounted in compartment 11, an inflatable air shelter 15 in storage 13, a high pressure air blower 16, a water pump 17, and a generator 18. Also shown is a vertical cabinet 19 enclosing the exhaust stack 20 for the generator engine.

Figure 4:
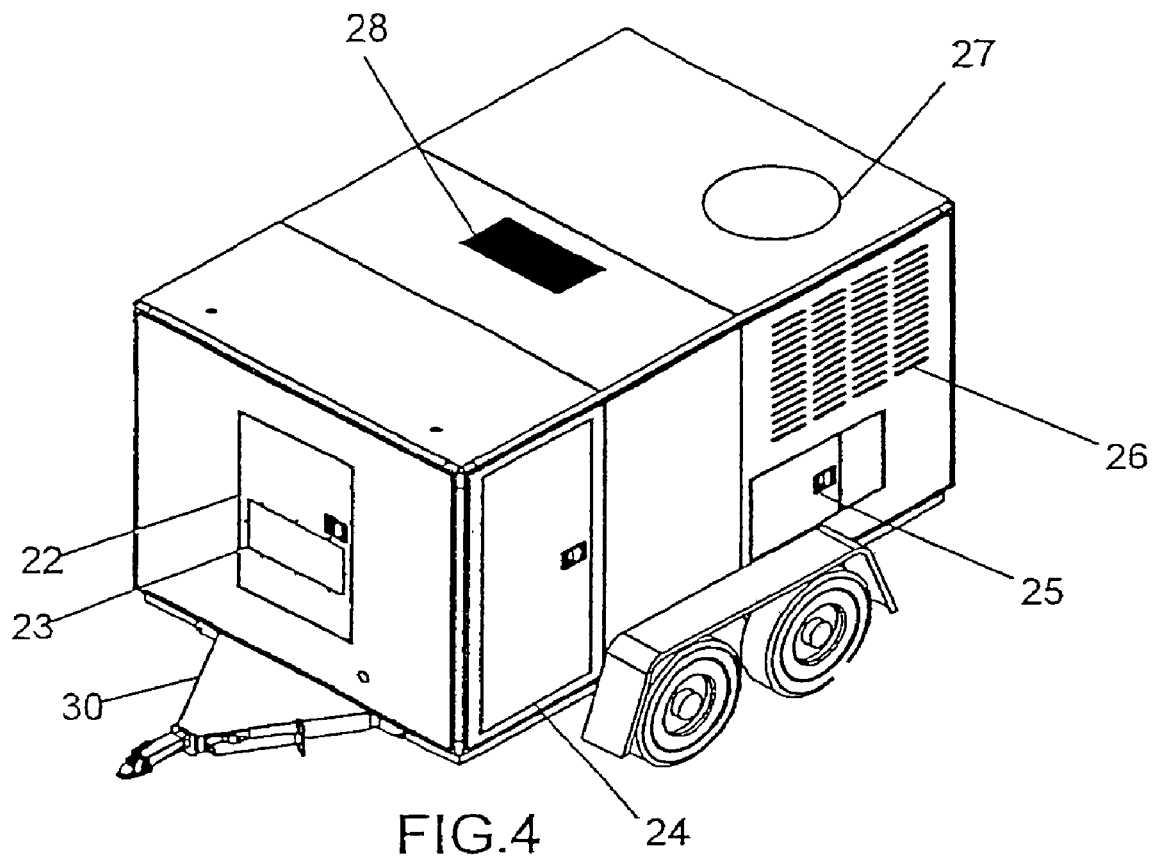
FIG. 4 is a perspective right front view of the portable A/C—Generator unit of the inventive air shelter system mounted on a trailer.

FIG. 4, a perspective right front view of the portable A/C—Generator unit 2 of the inventive air shelter system mounted on a trailer 3 shows generator 18 access and service doors 22 and 24, as well as a viewing window 23. Service and access door 25 for the water pump 17 and air blower 16 is also shown. An HVAC condenser air intake grill 26 and condenser fan exhaust port 27 are shown along with a grill 28 for engine heat and exhaust.

Figure 5:
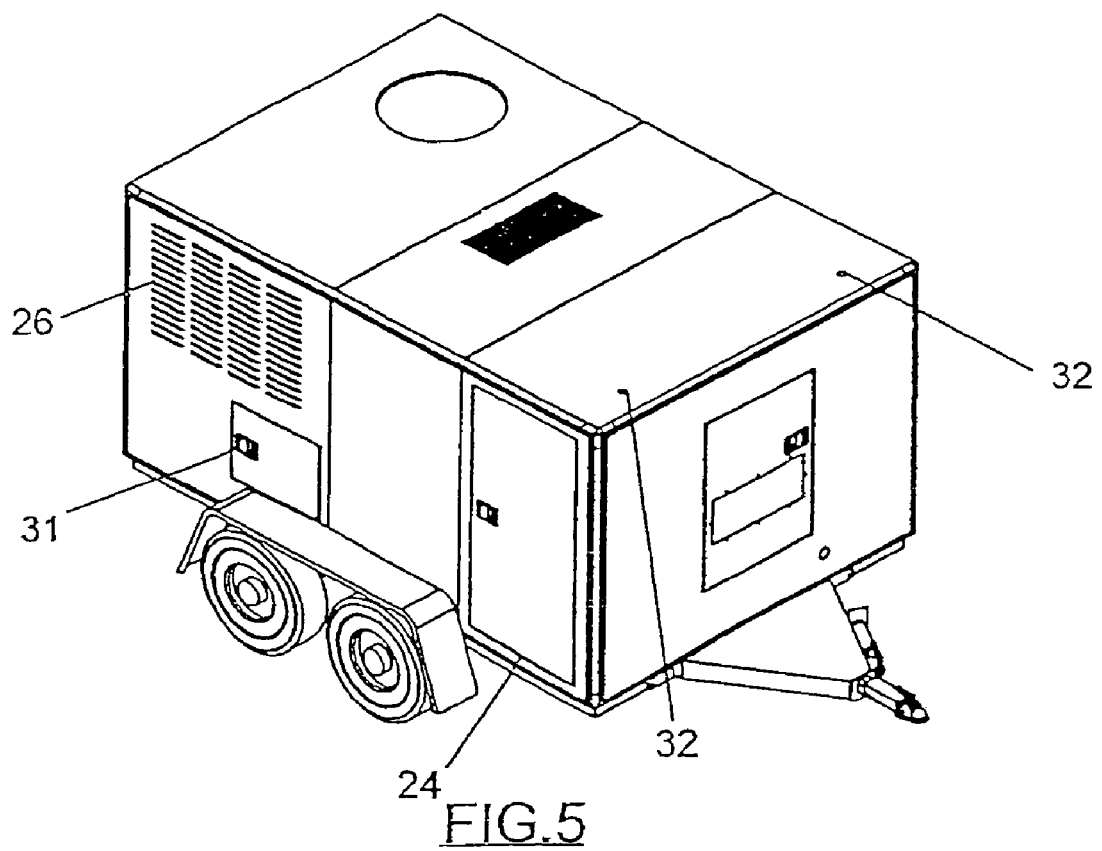
FIG. 5 is a perspective left front view of the portable A/C—Generator unit of the inventive air shelter system mounted on a trailer.

FIG. 5, a perspective left front view of the portable A/C—Generator unit 2 of the inventive air shelter system mounted on a trailer 3 also shows generator 18 access and service door 24 and a general service and access door 31. Also shown are bulkhead fittings 32 for exterior lighting.

Figure 6:
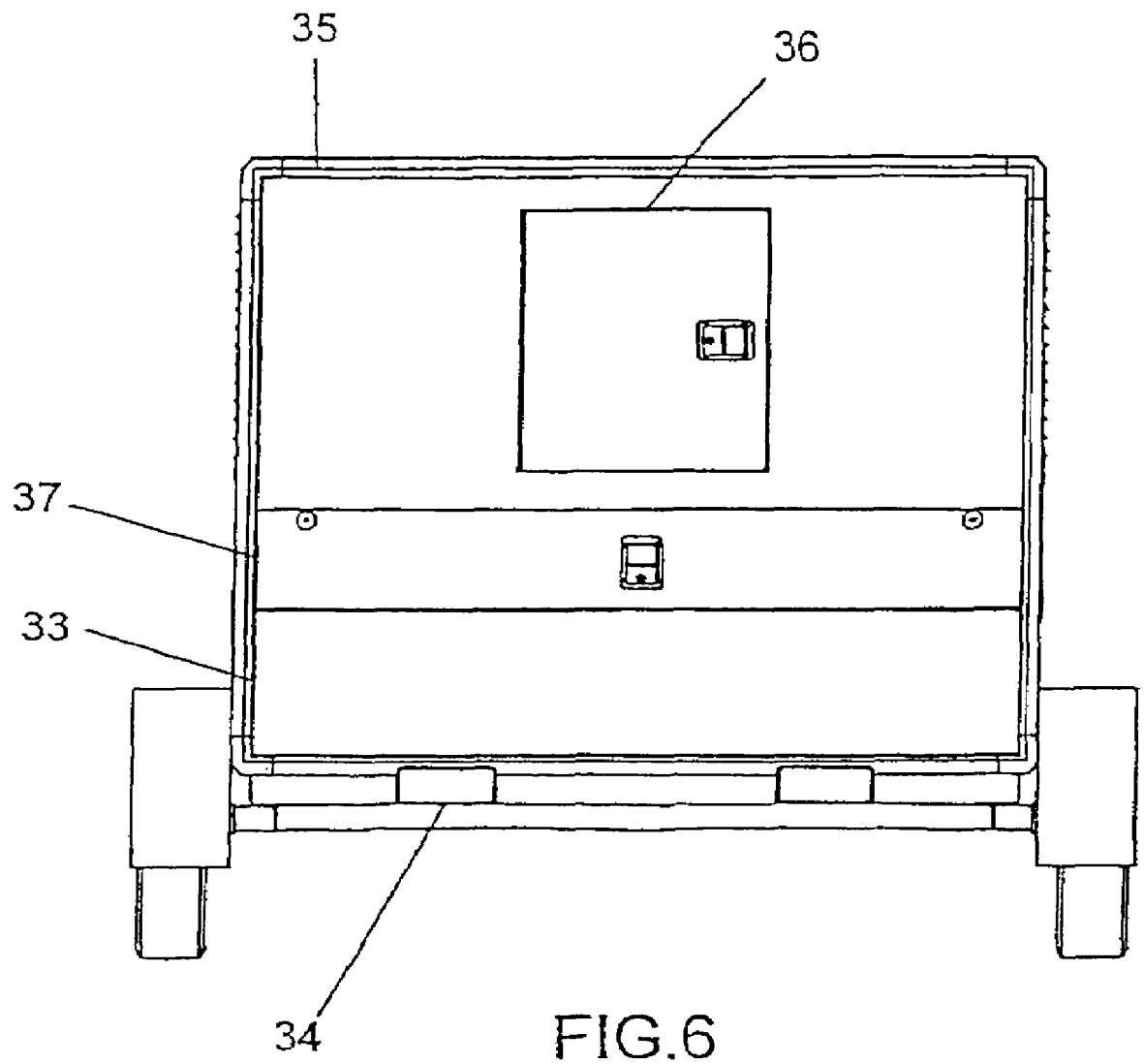
FIG. 6 is a back view of the portable A/C—Generator unit of the inventive air shelter system mounted on a trailer.

FIG. 6 is a back view of the portable A/C—Generator unit 2 of the inventive air shelter system mounted on a trailer 3 and shows an access door 33 for storage 13 for the portable air shelter when not being used. Fork openings 34 are shown for lifting the portable A/C—Generator unit if not transported on the trailer 3. An aluminum structural frame 35 is also depicted along with an HVAC supply air grill 36 and a return air opening 37.

Figure 7:
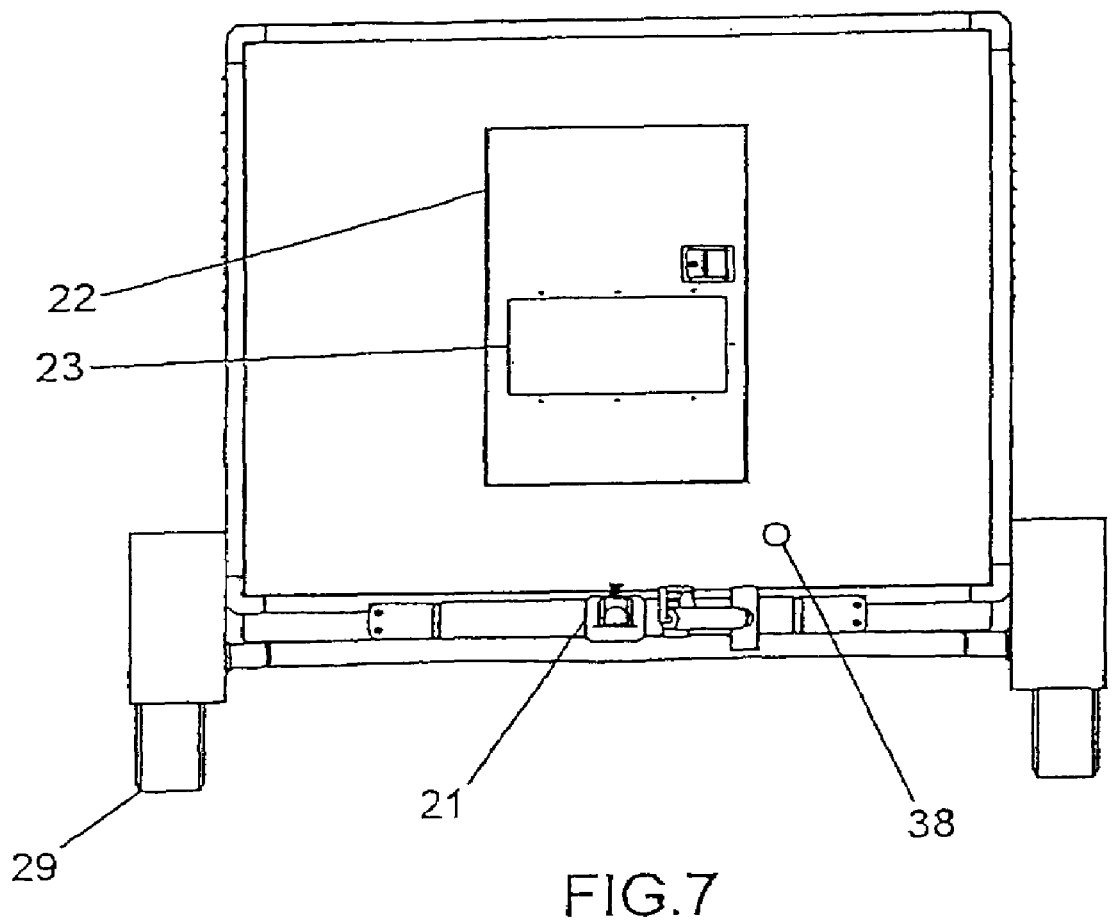
FIG. 7 is a front view of the portable A/C—Generator unit of the inventive air shelter system mounted on a trailer.

FIG. 7 is a front view of the portable A/C—Generator unit 2 of the inventive air shelter system mounted on a trailer 3 and shows a generator access door 22 and viewing window 23. Also shown is a house power electrical connection port 38.

Figure 8:
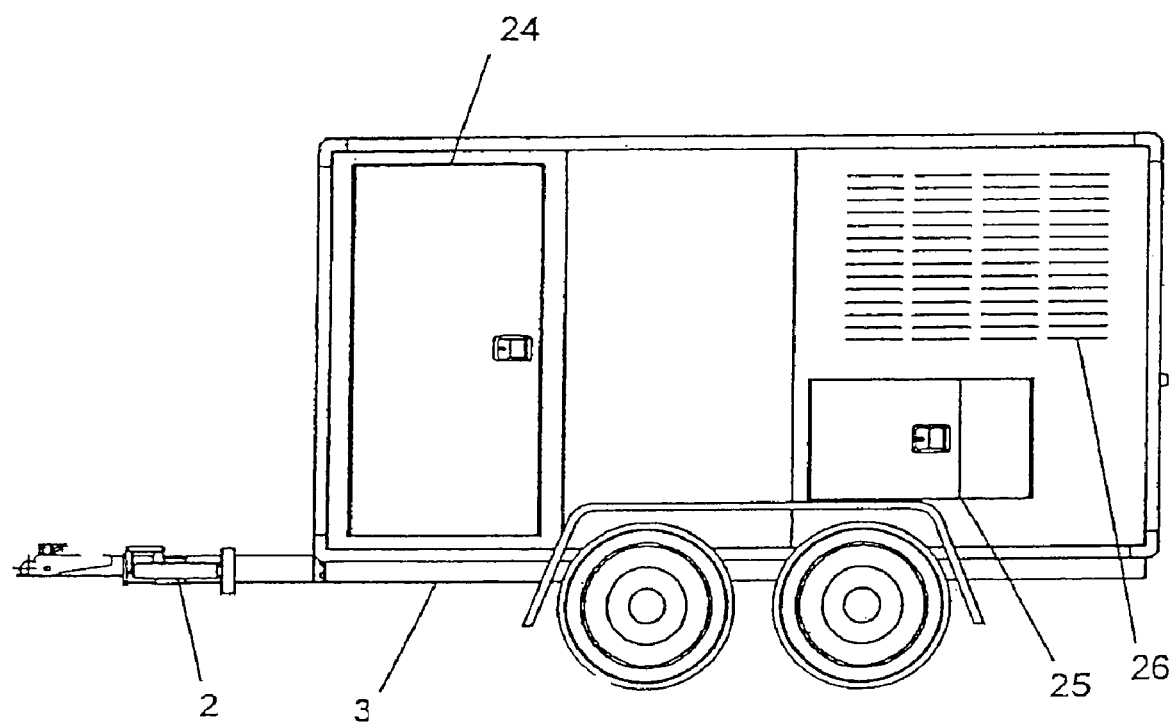
FIG. 8 is a right view of the portable A/C—Generator unit of the inventive air shelter system mounted on a trailer.

FIG. 8 is a right side view of the portable A/C—Generator unit 2 of the inventive air shelter system mounted on a trailer 3 and shows a generator access door 24, a service and access door 25 for the water pump 17 and air blower 16, and an HVAC condenser air intake grill 26.

Figure 9:
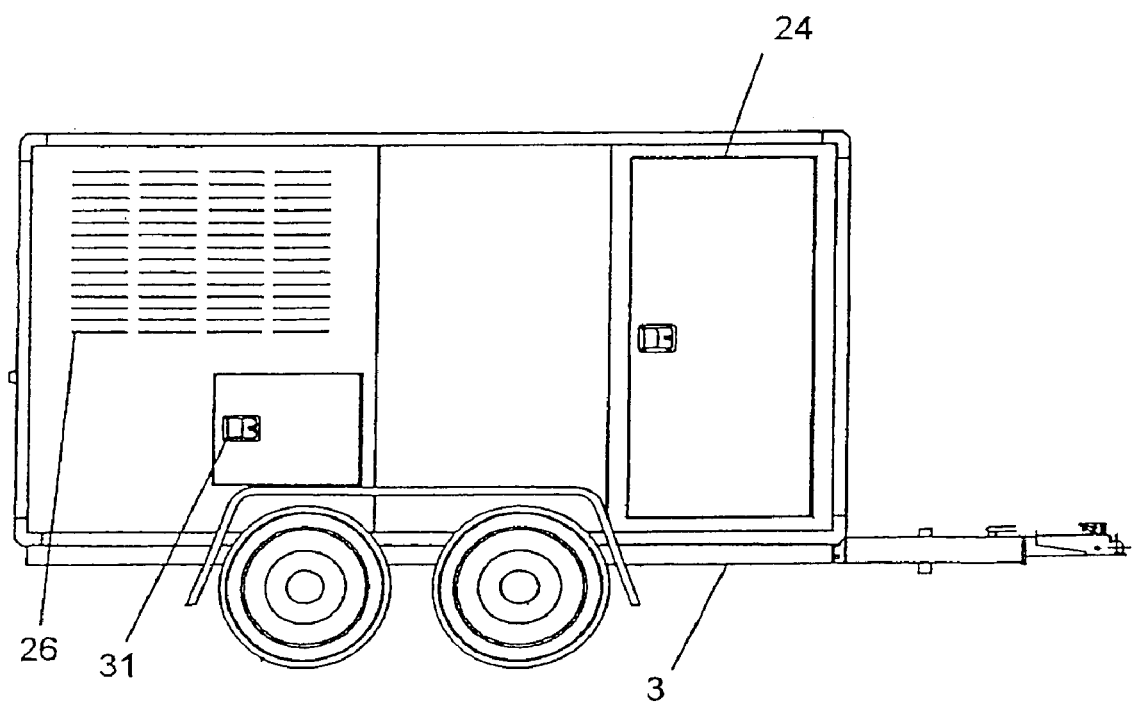
FIG. 9 is a left view of the portable A/C—Generator unit of the inventive air shelter system mounted on a trailer.

FIG. 9 is a left side view of the portable A/C—Generator unit 2 of the inventive air shelter system mounted on a trailer 3 and shows a generator access door 24, a service and access door 31 and an HVAC condenser air intake grill 26.

Figure 10:
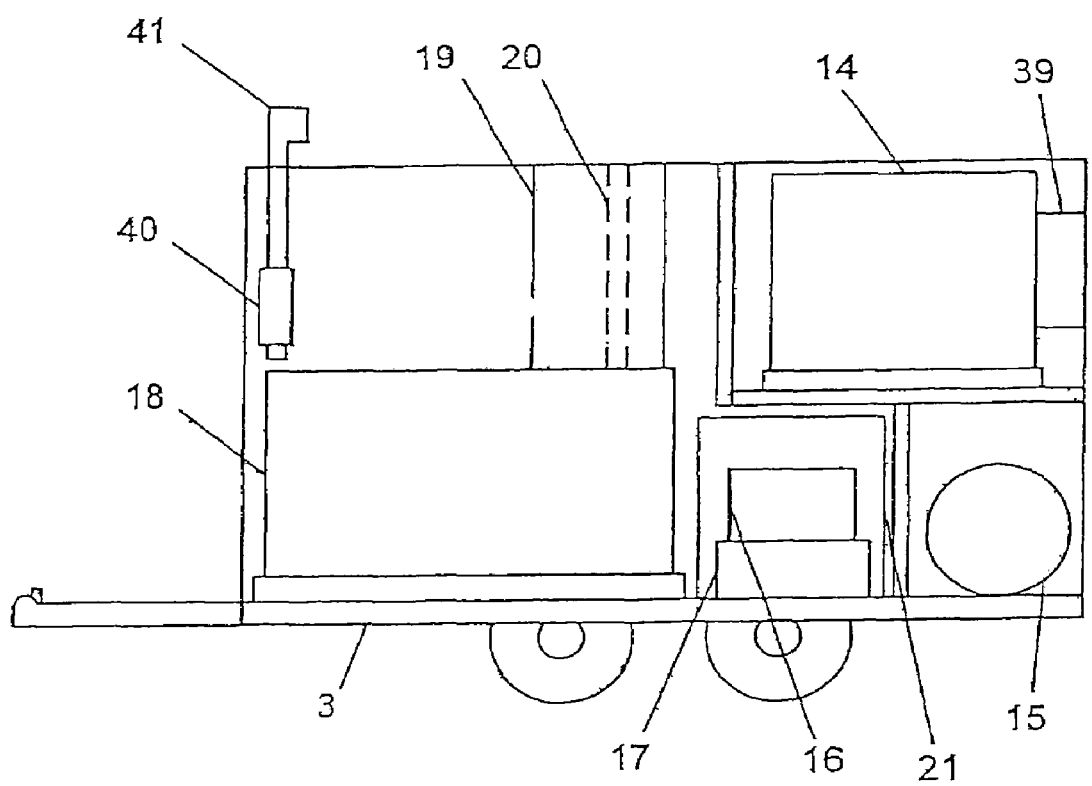
FIG. 10 is a right view of the components of the portable A/C—Generator unit of the inventive air shelter system mounted on a trailer.

FIG. 10 is a right view of the components of the portable A/C—Generator unit 2 of the inventive air shelter system mounted on a trailer 3 and shows details similar to those depicted in FIG. 3. In addition, FIG. 10 depicts a water storage tank 21, an HVAC supply air duct 39, an electrical panel 40 with transfer switch and a light system lift 41.

Figure 11:
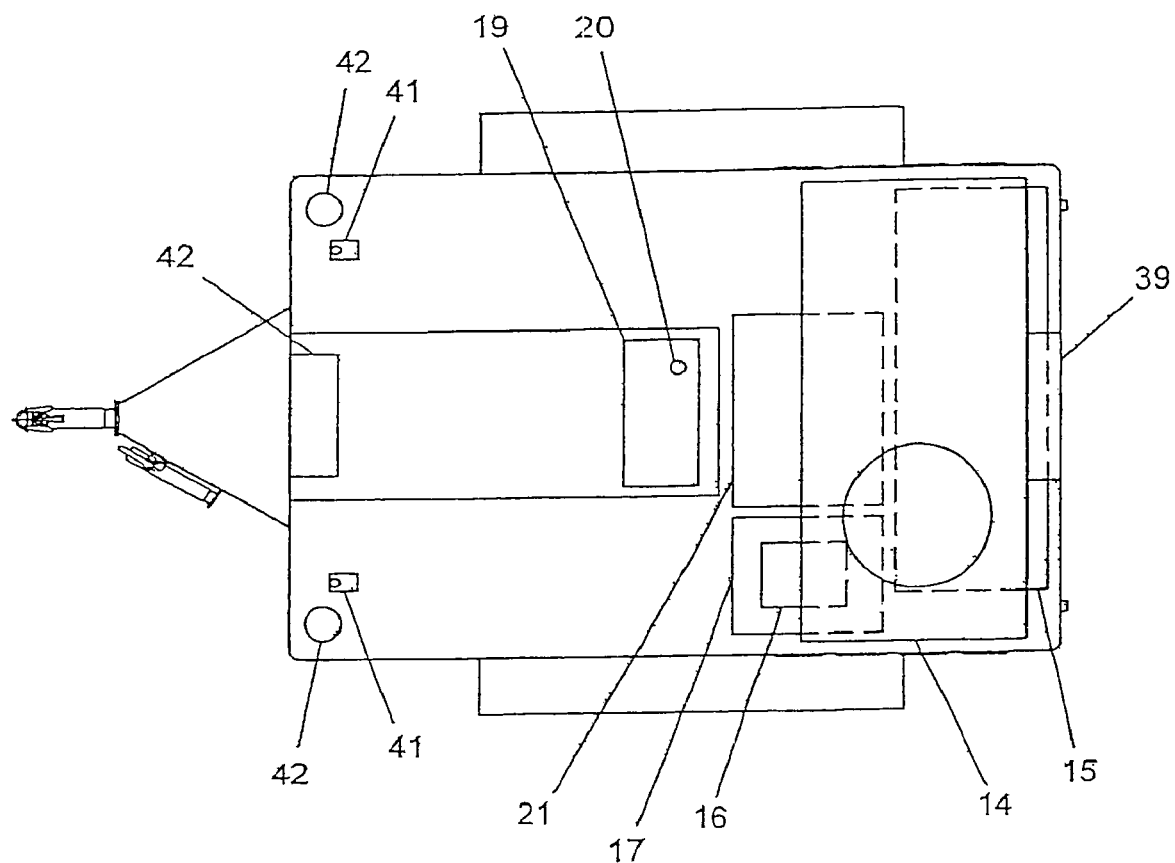
FIG. 11 is a top view of the components of the portable A/C—Generator unit of the inventive air shelter system mounted on a trailer.

The top view of the components of the portable A/C—Generator unit 2 of the inventive air shelter system mounted on a trailer 3 shown in FIG. 11 depicts the HVAC unit 14, an inflatable air shelter 15, the water pump 17 and air blower 16, the water storage tank 21, a vertical cabinet 19 enclosing the exhaust stack 20 for the generator engine, a light system lift 41 and external light fixtures 42.

Figure 12:
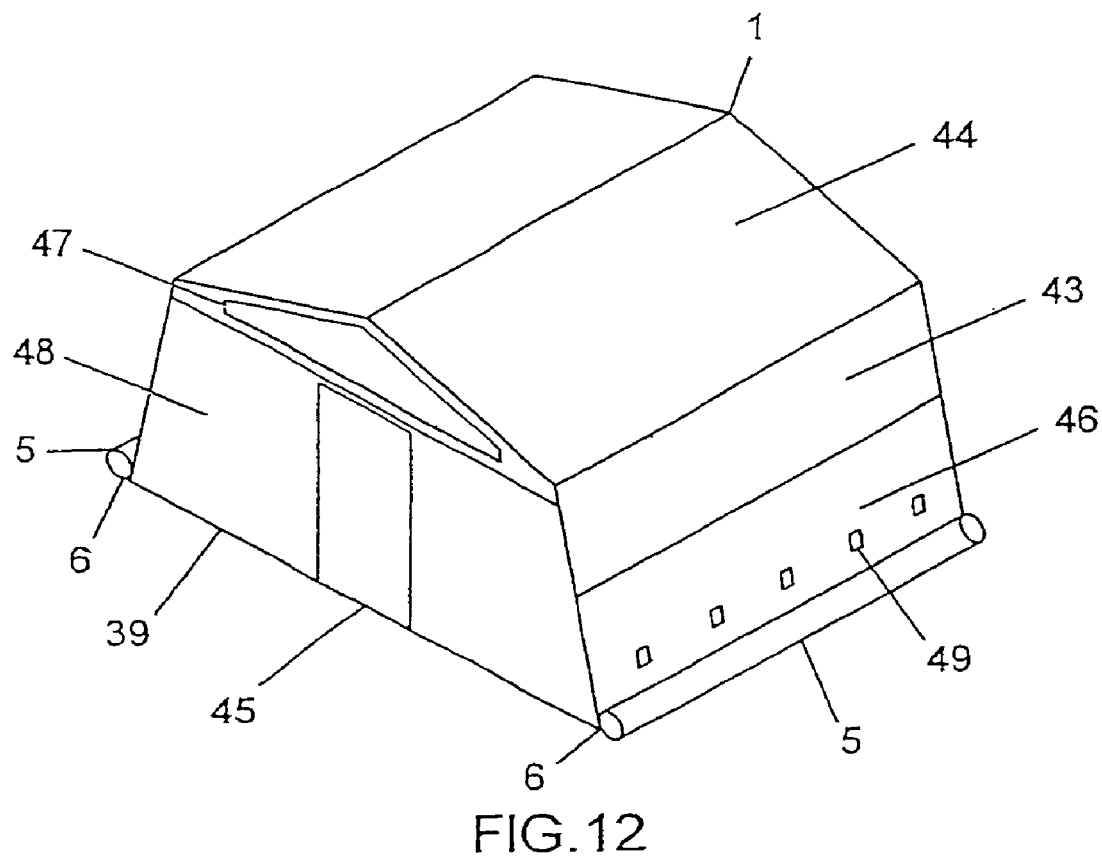
FIG. 12 is a perspective right front view of a portable air shelter.

The perspective right front view of a portable air shelter 1 depicted in FIG. 12 shows removable water ballast tubes 5 and zip-on connections 6 for attachment of the water ballast tubes 5. Also shown in FIG. 12 are windows 43, side wall panels 46, reflective roof panels 44, a front door opening 45, a removable front logo patch 47 and front shelter panels 48.

Figure 13:
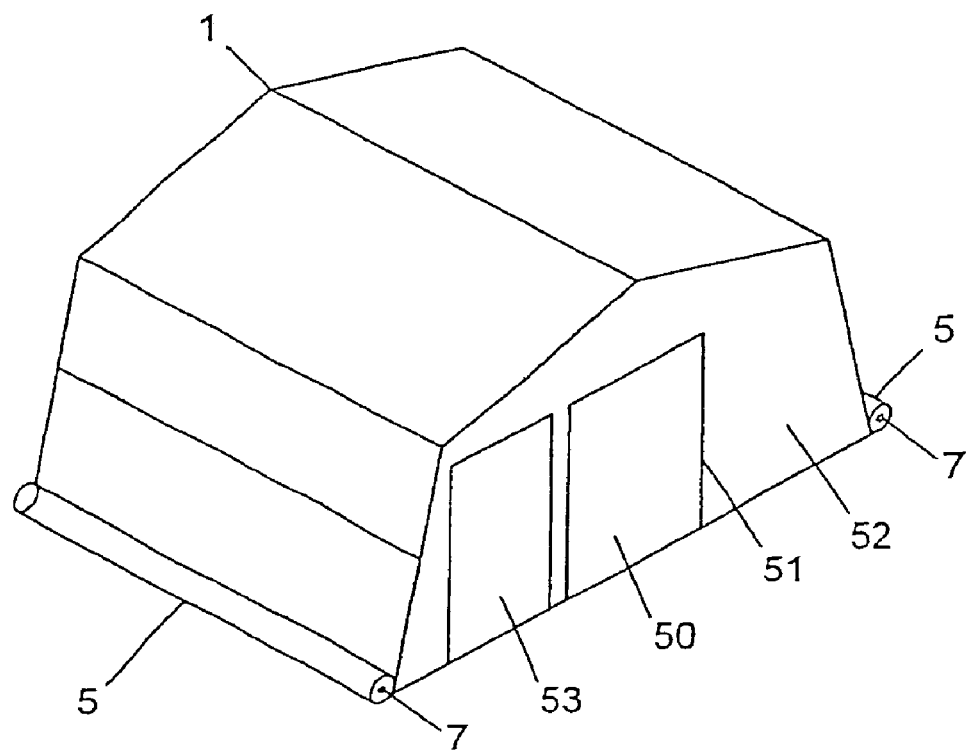
FIG. 13 is a perspective left back view of a portable air shelter.

In FIG. 13, a perspective left back view of a portable air shelter 1 is depicted showing removable water ballast tubes 5, water fill ports 7, a shelter connection 50 to the HVAC, Velcro straps 51 for attachment to the HVAC supply air duct 39 and a back door opening 53.

Figure 14:
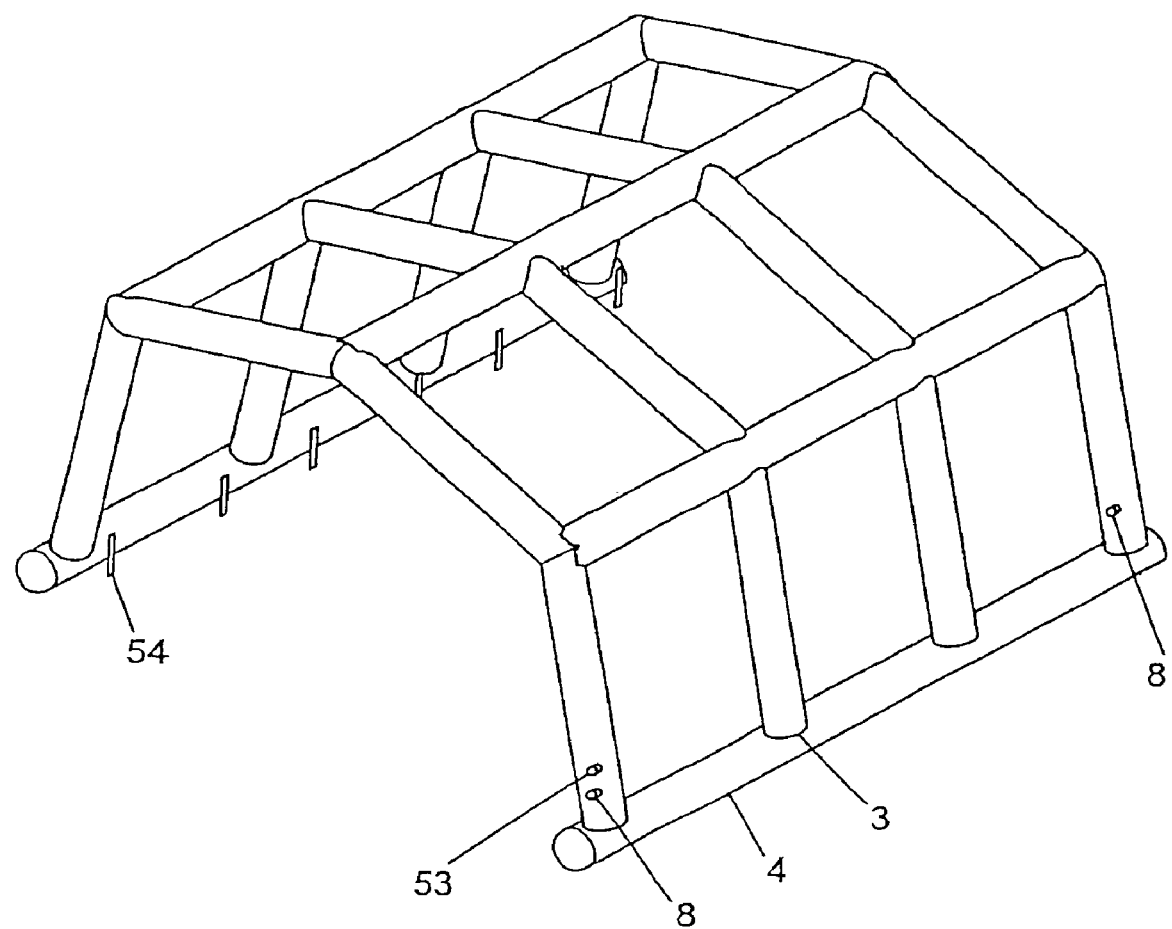
FIG. 14 is a perspective view of a high pressure air frame for a portable air shelter.

FIG. 14 depicts an inflated high pressure air frame 4 for a portable air shelter 1 with water ballast tubes 5, high pressure air fill ports 8 and an over inflation relief valve 53. Also shown are curtain straps 54.

Figure 15:
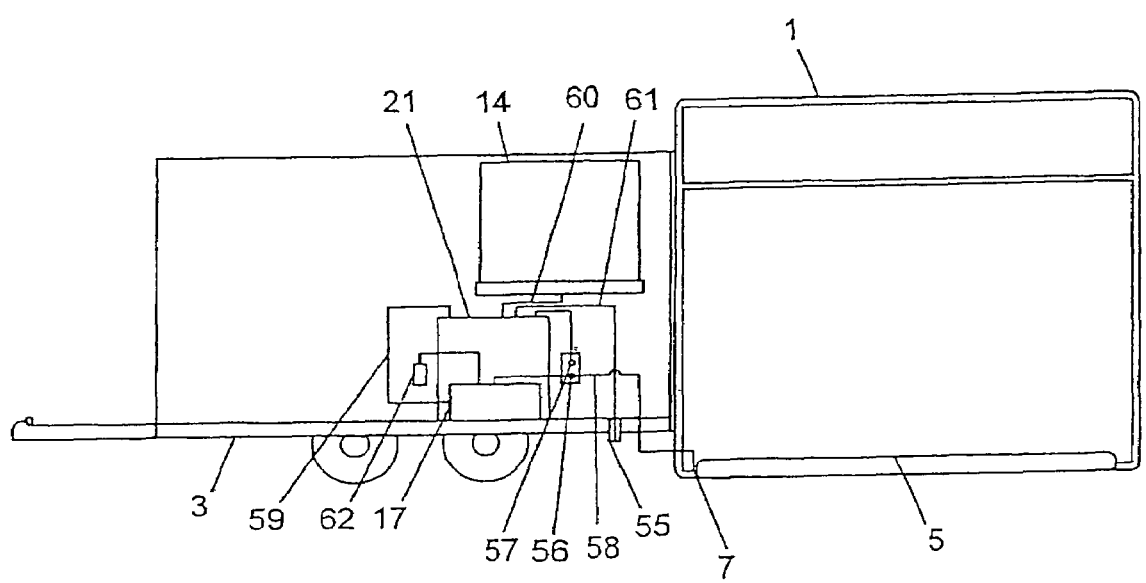
FIG. 15 is a schematic diagram of the water management system for the inventive air shelter system.

FIG. 15 is a schematic diagram of the water management system for the inventive air system and on the air shelter 1 shows the water ballast tubes 5 and water fill ports 7 connected to the water pump 17. A water line 59 connects the storage water tank 21 to the suction of the water pump 17. The water pump 17 motor is wired to an electrical connection 62. A condensate line 60 runs from the HVAC unit 14 to the water storage tank 21. Also shown is a water management system control panel 56, a water tank fill port 57 with service valve connected to the water storage tank 21 by water line 61, as well as a water storage tank overflow port 55.

Figure 16:
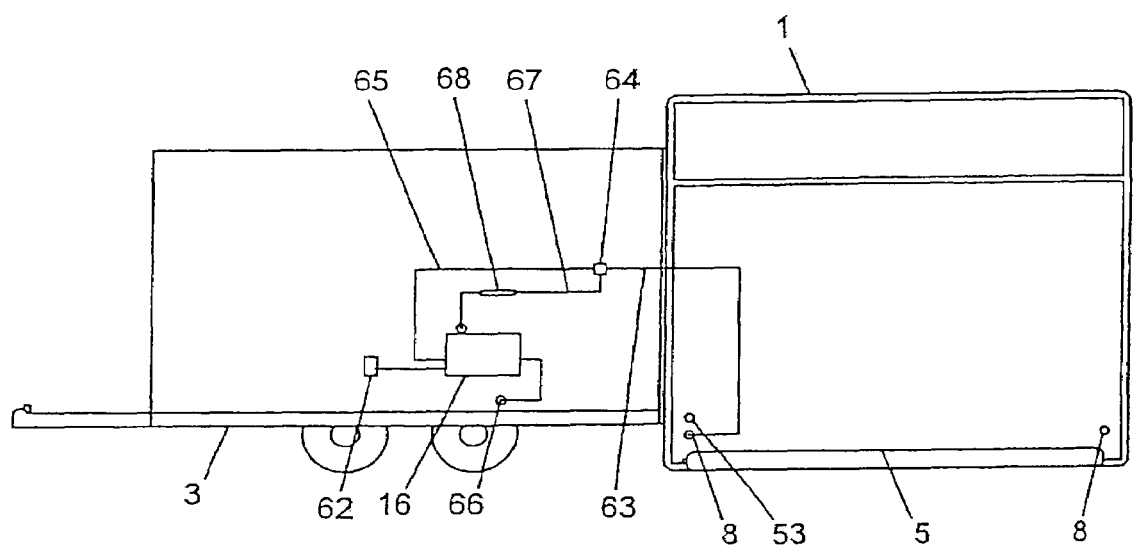
FIG. 16 is a schematic diagram of the high pressure air system for the inventive air shelter system.

FIG. 16 depicts a schematic for the high-pressure air system for the inventive air shelter system and shows the high-pressure air fill ports 8 on the air shelter 1 connected by high-pressure line 63 to three way air valve 64. Also shown is a high-pressure line 65 connected to the air blower 16. A high-pressure line 67 connects the three-way air valve 64 to a regulating valve 68 with electrical switch for control of air blower 16 motor. A high-pressure vacuum port 66 connects to the air blower 16. The motor the air blower 16 is powered through connection 62. A high-pressure relief valve 53 protects from over inflation. FIG. 16 does not show compressed air back-up tanks.

Figure 17:
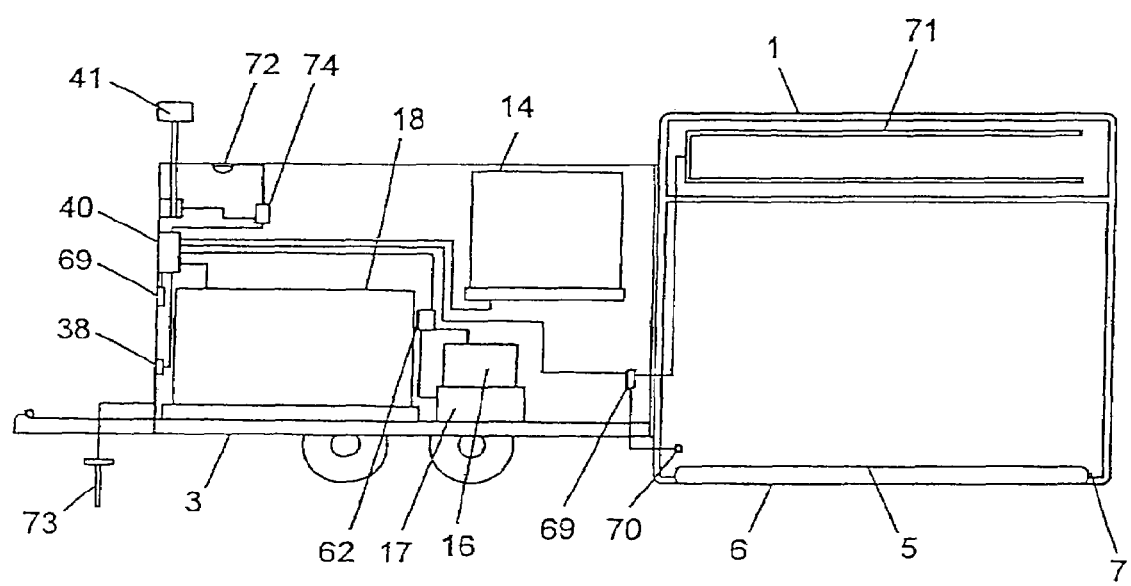
FIG. 17 is a schematic diagram of the electrical system for the inventive air shelter system.

In FIG. 17, the electrical system for the inventive air shelter system is depicted schematically with electrical power from the generator 18 powering the air blower 16 through connection 62, the water pump 17 and the HVAC unit 14 as well as interior lighting 71 for the air shelter 1 and interior service lighting 72 and a light system lift 41 and external light fixtures 42, controlled by light switch 74. Also shown are duplex outlets 69 and an extension cord 70 as well as a house power electrical connection 38. A control panel 40 provides a transfer switch and breakers for all components.

Figure 18:
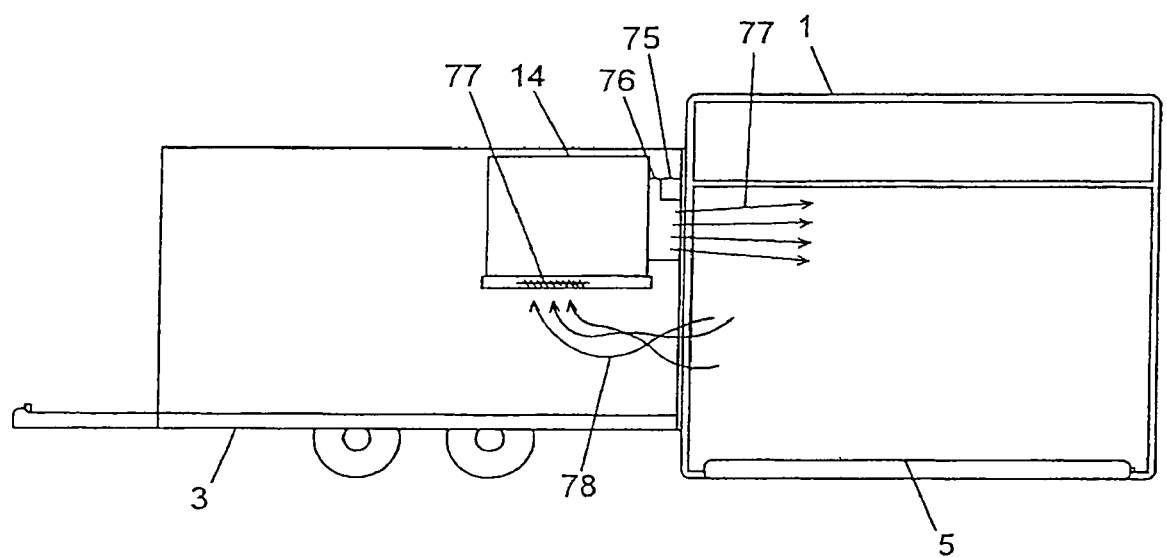
FIG. 18 is a schematic diagram of the heating and cooling supply air system for the inventive air shelter system.

FIG. 18 shows a schematic diagram of the heating and cooling supply air system for the inventive air shelter system showing filtered air 77 supplied to the air shelter 1 through the supply air duct 76. Return air 78 passes through a filtration system 79. Also shown is a thermostatic control system 75.

In further explanation of the features of the inventive air shelter system, an abbreviated set up and tear down procedure is described below for the trailer embodiment. These instructions will vary depending on the embodiment (trailer, truck bed, or containerized cargo box). The procedure is as follows:

(a) Required Materials and Tools
   a) No hand tools are required to operate unit, e.g. wrenches, hammer, etc.
   b) Required materials to be separated from integral trailer unit
      a. One inflatable air shelter
      b. Two yellow expandable A/C ducts
      c. Two black straps to attach A/C ducts to air shelter
      d. Two ground cover tarps (for protection of the shelter)
      e. Air blower, air hose, and heat absorption foam pad for blower
      f. Two water ballast tubes and fill hose (recommended option)

(b) Pre-Start Checklist
   a) Check fuel level for generator
   b) Check oil level for generator
   c) Check water level for ballasts (recommended option)
   d) Confirm house or generator power transfer switch
   e) Block trailer tires to inhibit trailer movement
   f) Remove and set ground stake
   g) Remove all equipment from storage area's (c) Generator Start/Controls
   a) Confirm all stored equipment is removed from generator area and storage area for proper airflow to generator set.
   b) Stand exhaust pipe in vertical position and secure clamp
   c) Confirm all breakers and switches are on off mode (Open position)
   d) Pull choke lever to full open
   e) Turn ignition switch to start mode and release when engine starts
   f) Push choke lever back to full closed
   g) Close the following breakers (in this order)
      a. Engine exhaust fan (This must be first to prevent overheating)
      b. Control power
      c. Light pole (optional)
      d. 115 volt power outlet (d) Air Shelter Set-Up
   a) Open back gate and release all hold down straps
   b) Place ground cover tarp (6 feet from edge of trailer ramp)
   c) Un-roll air shelter on top of ground tarp
   d) Attach high pressure air inflation hose to air frame fill port
   e) Confirm all attritional air fill ports are closed
   f) Turn on air blower to inflate air shelter and provide assistance to insure the air frame is not binding or caught in the shelter
   g) Attach (zipper) water ballast tube to air shelter (unless preattached)
   h) Attach hose from water tank to water ballast tube and fill with water, and then repeat to second water ballast tube (unless preattached)
   i) Attach supply and return air duct to shelter and secure with tie cords
   j) Extend 115 volt power supply cord from trailer to shelter through the accessory port (also the air fill port)
   k) Start A/C unit as it will help inflate the air shelter (Close A/C Breaker)
   l) Check connections on the supply and return air ducts
   m) Install front and rear strip doors on shelter
   n) Connect any lighting or internal devices to 115 volt power supply
   o) Confirm proper generator operation at unit control panel
   p) Attach logo to front of shelter before it get too high to reach
   q) Run 115 Volt AC extension cord to inside of shelter for lighting
   r) Place clean 16'×20' tarp in shelter on floor
   s) Set up tables and coolers inside of shelter.

(e) Tear Down Instructions
   a) Confirm all connections to generator
   b) Remove all items from inside shelter
   c) Confirm all people to be outside shelter
   d) Release high pressure air valve at back of shelter
   e) Connect vacuum side of air blower to high-pressure fitting on shelter and remove air from the shelter until the black tubes are flat. Leave the shelter doors open to allow trapped air to escape when rolling the shelter.
   f) Start high pressure fan and evacuate all air from structural tube
   g) Drain water from ballast tubes and detach water ballast tubes
   h) Detach doors and open door flaps and store in cabinet
   i) Detach supply and return air ducts and store in cabinet
   j) Detach vacuum hose from high pressure fitting
   k) Shut down generator and lower exhaust stack
   l) Neatly fold the air shelter into thirds and roll towards storage cabinet
   m) Cover air shelter with protective trap for travel
   n) Secure straps inside shelter cabinet
   o) Lower light pole and secure to trailer
   p) Release ground stake and store in trailer frame
   q) Turn-off (close) all rocker switches at control panel (in this order)
      a. Engine exhaust fan
      b. A/C
      c. Light pole (optional)
      d. 115 volt power outlet
   r) Remove blocks from trailer tires
   s) Store all tarps and misc. parts in storage cabinet
   t) Lock all cabinet doors for travel
   u) Check for loose or missing parts v) Check trailer lights and trailer connection before moving The major sub-systems are mounted and interconnected on a transport device such as a trailer, truck bed, or ISO containerized cargo box. FIG. 17 illustrates the electrical flow from the generator to the HVAC, inflation/deflation blower, auxiliary power, water pump, and control panel. This figure also illustrates all of the monitoring and controls of the various sub-systems from the single access point called the Control Panel 40. FIG. 15 illustrates the water flow from the HVAC unit 14 condensation line 60 to the water storage tank 21 and from the water storage tank 21 through a water pump 17 to the air shelter ballasts 5. FIG. 18 illustrates the airflow and duct work configurations. FIG. 16 illustrates the compressed air system.

The provisional patent application, No. 60/568,179, filed on May 4, 2004 claimed patent protection for four unique aspects of its utility: (a) the general assembly, integration of sub-systems, electrical flow, and embodiments; (b) the air flow systems, e.g. HVAC supply and return duct system, and air shelter inflation/deflation system; (c) the water management systems, e.g. water reservoir system for filling/empting the air shelter water ballasts, HVAC condensation collection; and (d) the control panel to monitor and control the system from a single point.

Considering the first of these unique aspects, the invention's general assembly integrates an electrical generator, climate control system (HVAC), chemical filtered air, inflation/deflation blowers for the inflatable self-support air shelter, water management system, lighting system, fuel system, and central control unit. Below is a listing of the features of each system:

(a) Electrical Generator
  a) Interconnection wiring
    a. Wiring to control panel
    b. Wiring to electrical transfer switch
    c. Wiring to house power external plug
    d. Wiring to 12 volt battery and kill switch
    e. Wiring connections to all other electrical loads
  b) Baffled Intake and Exhaust air systems
    a. Engine exhaust attenuator
    b. Engine heat baffle/attenuator
    c. Engine intake air stream attenuator
  c) Sound attenuated industrial cabinet
    a. 8 lb. rock wool acoustic blankets built into double wall construction
    b. Isolated cabinet/generator mounting kit
  d) 12 Volt charging and starting system
    a. emergency kill switch
    b. emergency 12 volt lighting system (for use before generator is on-line)

(b) HVAC Unit
  a) DX Cooling system
    a. High pressure refrigeration controls
    b. Low pressure refrigeration controls
    c. Electrical high/low/reverse and phase failure protection
    d. Refrigerant and temperature control system
  b) Electric Heating system
    a. High temperature cut outs and safeties
    b. Magnetic contacts for operation
  c) Chemical and Electrical Filter system
    a. Standard 1" throw away filters
    b. Standard 2" throw away filters
    c. Pleated Media filters
    d. Hepa filter racks
    e. Dynamic Filters (electronic) with
      1. Electrostatic/polarization
      2. VC lights
      3. Charcoal beds
  d) Pre-wired power and control systems
    a. Microprocessor temperature controls
    b. Remote temperature sensors
    c. Monitoring for operation
    d. Circuit breakers
    e. Run time meters
    f. Voltage and amp display
    g. Emergency kill switch
    h. Lighting controls
  e) External Duct System
    a. Supply air duct
    b. Return air duct
    c. Connection rings
    d. Rectangular duct sleeve (see FIG. 14)
    e. Duct within duct (see FIG. 15)

(c) High Pressure Inflation System
  a) High pressure Fan
  b) Compressed Air Back up tanks
  c) Air pressure regulator
  d) High-pressure hoses (d) Fuel System
  a) Fuel gauge with light
  b) Fuel filter
  c) Fuel kill switch
  d) Overflow/vent system (e) Water Management system
  a) Storage tank
  b) High pressure water pump
  c) Controls and valves
  d) Hose and hose bib connections
  e) Ballast tubes on shelters
  f) Pressure regulating pump (f) Exterior Lighting System
  a) Variable size and configurations
  b) Switches and controls
  c) Pre-wired (g) Exhaust System
  a) Folding exhaust stack for elevating exhaust emissions to 10' elevation. This is a new and unique design not currently available in the industry. The exhaust stack has a custom hinge that allows the 10' stack to be lowered and attached to the trailer frame for travel.

(h) Custom Shelter (Inflatable Self-support Air Shelter)
  a) Light weight materials
  b) Exterior clear panels for daytime lighting
  c) Integral electric lights (rope style) installed in shelter
  d) Removable end walls and floor panels
  e) Water ballast tubes
  f) Warehouse strip doors
  g) Removable logos for identification
  h) Removable front awning
  i) Tie down straps for emergency conditions
  j) Over pressurization relief valve
  k) Supply and return air duct connections (i) Electrical System
  a) Pre-wired
  b) All connections to major components are quick release Considering now the airflow systems, the system level air-flow in the invention includes the supply-return duct available in three options. The first option is 12" temporary ducts.

The duct will be cut in 25' pre-cut sections including integral straps for quick and easy connections to both the shelter and HVAC unit. The second option is a 12" rectangular sleeve. This option allows the shelter to be close coupled to the HVAC unit. This sleeve has industrial Velcro for easy connection. The third option is the duct within the duct system.

The duct within a duct system, a specially designed supply/return air duct system allows setup and teardown without human interface. The key issues are that the entire duct system inflates under its own internal pressure without any assistance. The duct system has no structural support other than the internal air pressure generated by the supply air stream. The importance of this is that the duct system can be stored in a rolled form with the soft air shelter at a minimum space.

The duct system is unrolled like a sleeping bag as the air shelter is rolled into place. The connections are pre-made and do not require any field assembly. When the supply air fan is enabled the static pressure in the outer ring inflates and expands the tube under its own internal pressure. The return air stream has a slightly negative air pressure that tends to collapse the duct, but the positive air pressure in the external tube expanding under higher pressure overcomes it.

The duct system is naturally self-insulating because of the internal and external tube configuration. This saves valuable heating and cooling capacity that would otherwise be lost. Capabilities include:

(a) Self inflating and deflating (b) Very compact size for minimum storage requirements (c) No sharp frame members to damage the inflatable shelter material (d) Pre Connected to both the shelter and A/C unit.

The Compressed Air System (CAS) has the ability to maintain a constant pressure for the shelter airframe regardless of connection to the high-pressure inflation fan system. This allows the generator to be cycled off in times of low electrical needs and the shelter will remain inflated to a design pressure of 3.5 PSIG. The CAS consists of two compressed air bottles manifolded together and pre-piped to a pressure regulator. The CAS tanks hold roughly enough to fill the shelter. This onboard system is complete with hoses, fittings, and pressure relief pop off valves, pressure regulator valves and storage area. Capabilities include:

(a) Non-flammable compressed air supply tanks;

(b) Self-contained pressure regulating valve; and (c) Integral pressure relief pop off valves to protect the shelter from over pressurization.

The Water Management System (WMS) provides a number of unique capabilities. FIG. 15 depicts the WMS flow for the invention including its internal storage water tank 21, on-board water pump 17 for the air shelter ballast tubes 5, and HVAC unit 14 condensation collection line 60. This system has the capacity to store condensate generated by the air conditioning system, provide a portable water supply for use in variety of ways. The water can be used to fill the water ballast tubes 5 to stabilize the air shelter 1 in windy conditions. The water can be used for emergency clean up needs or general wash down of equipment and tools. The water at this point is not potable or designed for human consumption.

The WMS contains an onboard storage water tank 21. This tank is pre-piped to the condensate system of the HVAC unit 14. This allows the storage of condensate water directly from the HVAC unit 14. Many sites do not allow water to be spilled for safety and general reasons. In normal conditions the storage water tank 21 has enough capacity to hold the condensate generated in 48 hours of unit operation.

The WMS has a built in pump system 17 to pump out under pressure the entire storage water tank 21 in less than 5 minutes. The pump 17 can work against an external pressure of 15 ft. WG. This means the pump 17 can be used under pressure to clean up a site and the equipment if necessary. The pump 17 is 120 volts and is pre wired to the generator 18.

The WMS can be used as a storage tank for the water ballast system required for the air shelter. This system can be pre-filled and pumped under pressure into the shelter ballast tubes 5 in a matter of minutes. The importance of this is that it eliminates the use of stakes for air shelter 1 tie downs. Many shelter applications are located in parking lots and on surfaces that cannot be damages with shelter stakes. Normally the air shelter 1 would require that heavy weights be brought in to hold the air shelter 1 stable in windy conditions. At 8 lbs per gallon the water makes an excellent ballast and can be drained at the end of the service.

The integrated control panel 40 allows monitoring and controlling of all electrical sub-systems for the entire unit from a single point including: electrical generator, house power, exhaust fans, high pressure inflation/deflation, auxiliary power to air shelter, external lighting. The entire control panel 40 has a lockable door 22 with a clear view window 23 and a 12-volt backlit face for nighttime operation.

The invention claimed is:

1. A portable climate controlled air shelter system for protection from harsh climatic environments comprising sub-systems integrally combined on a transport device wherein said subsystems comprise:
   a. an inflatable self-supporting air shelter subsystem with an airframe and inflation/deflation blowers;
   b. an electtical generator subsystem with fuel subsystem;
   c. a heating ventilation and air conditioning subsystem for the self-supporting air shelter;
   d. a central control subsystem.
   e. an air filtration subsystem;
   f. a water management subsystem with water storage tank and pump further comprising at least one water ballast tube for mechanical attachment to the self supporting air shelter wherein said water ballast tubes are filled and emptied by the water management system;
   g. a lighting subsystem; and
   h. at least one storage compartment when the airframe is deflated.

2. A portable climate controlled air shelter system according to claim 1 wherein the electrical generator system is pre-wired to the other sub-systems and the central control subsystem further comprises a panel for monitoring and controlling the sub-systems.

3. A portable climate controlled air shelter system according to claim 2 wherein an electrical transfer switch is provided to allow the use of electrical power external to the electrical generator subsystem.

4. A portable climate controlled air shelter system according to claim 3 wherein the heating ventilation and air conditioning subsystem further comprises a supply air duct to the self-supporting air shelter and a return air opening from the self-supporting air shelter.

5. A portable climate controlled air shelter system according to claim 4 wherein the electrical generator subsystem is pre-wired with a 115 volt convenience outlet for the self-supporting air shelter.

6. A portable climate controlled air shelter system according to claim 5 wherein the transport device comprises a trailer.

7. A portable climate controlled air shelter system according to claim 5 wherein the transport device comprises a truck bed.

8. A portable climate controlled air shelter system according to claim 5 wherein the transport device comprises an ISO container box.

9. A portable climate controlled air shelter system according to claim 2 wherein:
   a. the airframe is high pressure and the inflatable self-supporting air shelter subsystem further comprises, exterior clear panels, integral electric lights, removable end walls and floor panels, ova pressurization relief valve, high pressure air fill ports, supply and return air duct connections;
   b. the electrical generator subsystem further comprises i) interconnection wiring to a control panel, electrical transfer switch, house power plug, 12 volt battery and kill switch and all other electrical loads, ii) baffled intake and exhaust air systems including an engine exhaust attenuator, an engine heat baffle/attenuator and an engine intake air stream attenuator, iii) sound attenuated industrial cabinet and iv) 12 volt charging and starting system;
   c. the heating ventilation and air conditioning system further comprises i) a cooling system with high pressure refrigeration controls, low pressure refrigeration controls, electrical high/low/reverse and phase failure protection, ii) an electric heating system, iii) a chemical and electrical filter system with throw away filters, pleated media filters, Hepa filter racks, and dynamic filters with electrostatic/polarization, UVC lights and charcoal beds, iv) pro-wired power and control systems with microprocessor temperature controls, remote temperature sensors, operation monitoring, circuit breakers, run time meters, voltage and amp display, an emergency kill switch and lighting controls.

10. A portable climate controlled air shelter system according to claim 9 wherein the subsystems further comprise:
    a. a high-pressure inflation subsystem comprising a high-pressure fan, compressed air back-up tanks, air pressure regulator and high pressure hoses;
    b. the fuel subsystem further comprises a fuel gauge with light, a fuel filter, a fuel kill switch and overflow vent system;
    c. the water management subsystem further comprises a high-pressure water pump, valves and controls, hose and hose connections, and pressure regulating pump;
    d. an exterior lighting system;
    e. a generator exhaust subsystem with folding exhaust stack fur elevating exhaust emissions;
    f. the pre-wired electrical subsystem further comprises quick release connections to all major components.

* * * * *